United States Patent [19]

Inoue

[11] Patent Number: 4,887,044
[45] Date of Patent: Dec. 12, 1989

[54] PULSE COUNTER TYPE DEMODULATOR
[75] Inventor: Taketoshi Inoue, Tokyo, Japan
[73] Assignee: NEC Corporation, Japan
[21] Appl. No.: 148,962
[22] Filed: Jan. 27, 1988
[30] Foreign Application Priority Data Jan. 30, 1987 [JP] Japan .................................. 62-20303

[51] Int. Cl.$^4$ ......................... H03D 3/00; H04L 27/14
[52] U.S. Cl. ...................................... 329/300; 375/82;
   375/94; 329/341
[58] Field of Search ............... 329/104, 105, 107, 122,
   329/126, 128; 375/80, 82, 88, 94

[56]  References Cited
   U.S. PATENT DOCUMENTS 3,233,181  2/1966  Calfee ................................... 329/128
   3,529,247  9/1970  Nelson ............................. 329/107 X
   4,389,621  6/1983  Futatsuishi .......................... 331/1 A

*Primary Examiner*—Siegfried H. Grimm
*Attorney, Agent, or Firm*—Laff, Whitesel, Conte & Saret

[57]  ABSTRACT

The demodulation circuit includes a Schmitt trigger circuit, first and second monostable multivibrators, a quartz oscillator, first and second low-pass filters, and a comparator. The Schmitt trigger circuit converts a modulated signal modulated by data into a pulse signal. The first monostable multivibrator converts an output from the Schmitt trigger circuit into a PPM signal. The quartz oscillator oscillates at the same frequency as the center frequency of the modulated signal. The second monostable multivibrator is formed on the same chip as the first monostable multivibrator and responsive to an output signal from the quartz oscillator. The second monostable multivibrator generates a signal comprising a pulse train having the same pulse width as that of the PPM signal output form the first monostable multivibrator and a constant pulse separation. The first low-pass filter receives an output from the first monostable multivibrator. The second low-pass filter receives an output from the second monostable multivibrator. The comparator compares an output signal from the first low-pass filter with an output signal from the second low-pass filter as a threshold level, and obtains modulation data.

8 Claims, 4 Drawing Sheets

PULSE COUNTER TYPE DEMODULATOR

BACKGROUND OF THE INVENTION

The present invention relates to a demodulation circuit and, more particularly, to a pulse counter type demodulation circuit.

Recently, pulse counter demodulation circuits are used frequently since they can be integrated and they do not need adjustment.

FIG. 1 is a block diagram of a typical conventional pulse counter type demodulation circuit.

Referring to FIG. 1, a modulated signal applied to an input terminal 1 is converted into a pulse signal by a Schmitt trigger circuit 2. An output pulse signal from the Schmitt trigger circuit 2 is input to a monostable multivibrator 31 and converted into a pulse position modulated (PPM) signal comprising pulses having a predetermined width. An output PPM signal from the monostable multivibrator 31 is input to a low-pass filter 4 to remove its high-frequency components. An output signal from the low-pass filter 4 is compared with a reference voltage VR as a threshold level by a comparator 7. Signals higher and lower than the reference voltage are respectively assigned to two voltage levels and output to an output terminal 8 as demodulated signals.

In the pulse counter type demodulation circuit shown in FIG. 1, the voltage of the demodulated signal appearing at the output terminal 8 is defined by the pulse width and amplitude of the PPM signal obtained by the monostable multivibrator 31. Therefore, when a source voltage +V applied to the monostable multivibrator 31 varies, or when the values of the circuit elements of the monostable multivibrator 31 are changed by a change in temperature or the like and accordingly the pulse width or the pulse amplitude of the PPM signal varies, the output voltage from the monostable multivibrator 31 and, accordingly, the output voltage from the low-pass filter 4 varies. Since the reference voltage VR supplied to the comparator 7 does not vary, the comparison result of the comparator 7 directly reflects the influence of the above variation. Therefore, when a digital signal such as an FSK (frequency shift keying) signal and a binary FM signal is to be demodulated, a bit error rate (BER) in the demodulated signal becomes higher.

U.S. Pat. No. 4,389,621 discloses a phase-locked loop (PLL) circuit which uses a voltage controlled oscillator for suppressing the unstable operation of a digital circuit caused by the variation in temperature or source voltage. However, correction using the PLL circuit is performed only when the PPL circuit is in the locking state and when the pulse amplitude of a 50% duty cycle output from an S-R flip-flop varies, and an unstable operation caused by a variation in pulse width is not corrected. Furthermore, since the PLL circuit has a loop arrangement, it is not suitable for demodulation of high-speed data and cannot demodulate input signals supplied in a burst manner.

SUMMARY OF THE INVENTION

It is an object of the present invention to provide a demodulation circuit wherein the conventional drawbacks described above are eliminated, a variation in demodulated signal including a variation in pulse width can be corrected, and high-speed and/or burst-like input data can be effectively demodulated.

The demodulation circuit according to the present invention comprises a Schmitt trigger circuit for converting a modulated signal which is modulated by data into a pulse signal, a first monostable multivibrator for converting an output from the Schmitt trigger circuit into a PPM signal, a quartz oscillator for oscillating at the same frequency as the center frequency of the modulated signal, a second monostable multivibrator, formed on the same chip as the first monostable multivibrator and responsive to an output signal from the quartz oscillator, for generating a signal comprising a pulse train having the same pulse width as that of the PPM signal output from the first monostable multivibrator and a constant pulse separation, a first low-pass filter for receiving an output from the first monostable multivibrator, a second low-pass filter for receiving an output from the second monostable multivibrator, and a comparator for comparing an output signal from the first low-pass filter with an output signal from the second low-pass filter as a threshold level, and obtaining modulation data.

DETAILED DESCRIPTION OF THE PREFERRED EMBODIMENT

The present invention will be described in detail with reference to the accompanying drawings.

Figure 1:
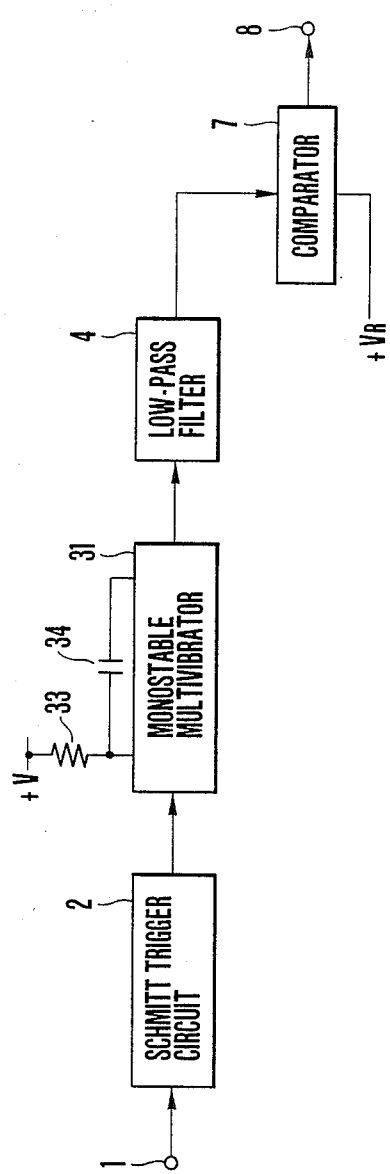
FIG. 1 is a block diagram of a conventional pulse counter type demodulation circuit.
Figure 2:
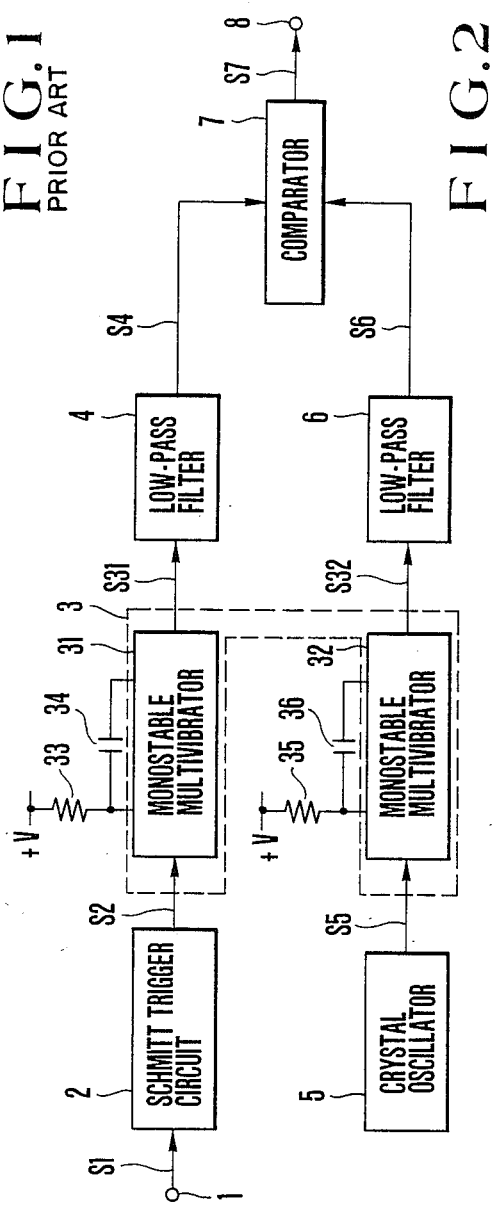
FIG. 2 is a block diagram of a demodulation circuit according to the present invention.

FIG. 2 is a block diagram of a pulse counter type demodulation circuit according to an embodiment of the present invention.

Referring to FIG. 2, a signal S1 obtained by modulating a carrier with data is input to a Schmitt trigger circuit 2 through an input terminal 1 and converted into a pulse signal S2. The output signal S2 from the Schmitt trigger circuit 2 is input to a monostable multivibrator 31. The monostable multivibrator 31 converts the signal S2 into a PPM signal S31 consisting of a pulse train of a predetermined pulse width, and outputs the PPM signal S31 to a low-pass filter 4. A resistor 33 and a capacitor 34 are attached to the monostable multivibrator 31 to determine the pulse width of the PPM signal S31. The low-pass filter 4 supplies an output signal S4 to one input terminal of a comparator 7. The signal S4 is obtained by eliminating a high-frequency component from the PPM signal S31.

A crystal oscillator 5 oscillates at a same frequency as the center frequency of the modulated signal S1, i.e., intermediate frequency and outputs a clock signal S5 to a monostable multivibrator 32. A block 3 encircled by a broken line indicates that the monostable multivibrators 31 and 32 are formed on the same chip. The multivibrator 32 receives the clock signal S5 supplied from the crystal oscillator 5 and converts it into a signal S32 consisting of a pulse train having a constant separation and the same pulse width as that of the output signal S31 from the multivibrator 31. The signal S32 is supplied to a low-pass filter 6. A resistor 35 and a capacitor 36 are attached to the monostable multivibrator 32 to determine the pulse width of the signal S32. The low-pass filter 6 outputs a signal S6 to the other input terminal of the comparator 7. The signal S6 is obtained by eliminating the high-frequency component from the signal S32. The comparator 7 has the level of the output signal S6 from the low-pass filter 6 as the threshold level and compares the output signal S4 from the low-pass filter 4 with the threshold level, thereby obtaining a demodulated data signal S7. The demodulated data signal S7 is output to an output terminal 8.

The resistors 33 and 35 respectively attached to the monostable multivibrators 31 and 32 have the same resistance and temperature characteristics. The capacitors 34 and 36 respectively attached to the monostable multivibrators 31 and 32 have the same capacitance and temperature characteristics.

The operation of the demodulation circuit shown in FIG. 2 will be described.

First, a case wherein both the pulse width and amplitude of the output signals S31 and S32 of the monostable multivibrators 31 and 32 have no variation will be described.

Figure 3:
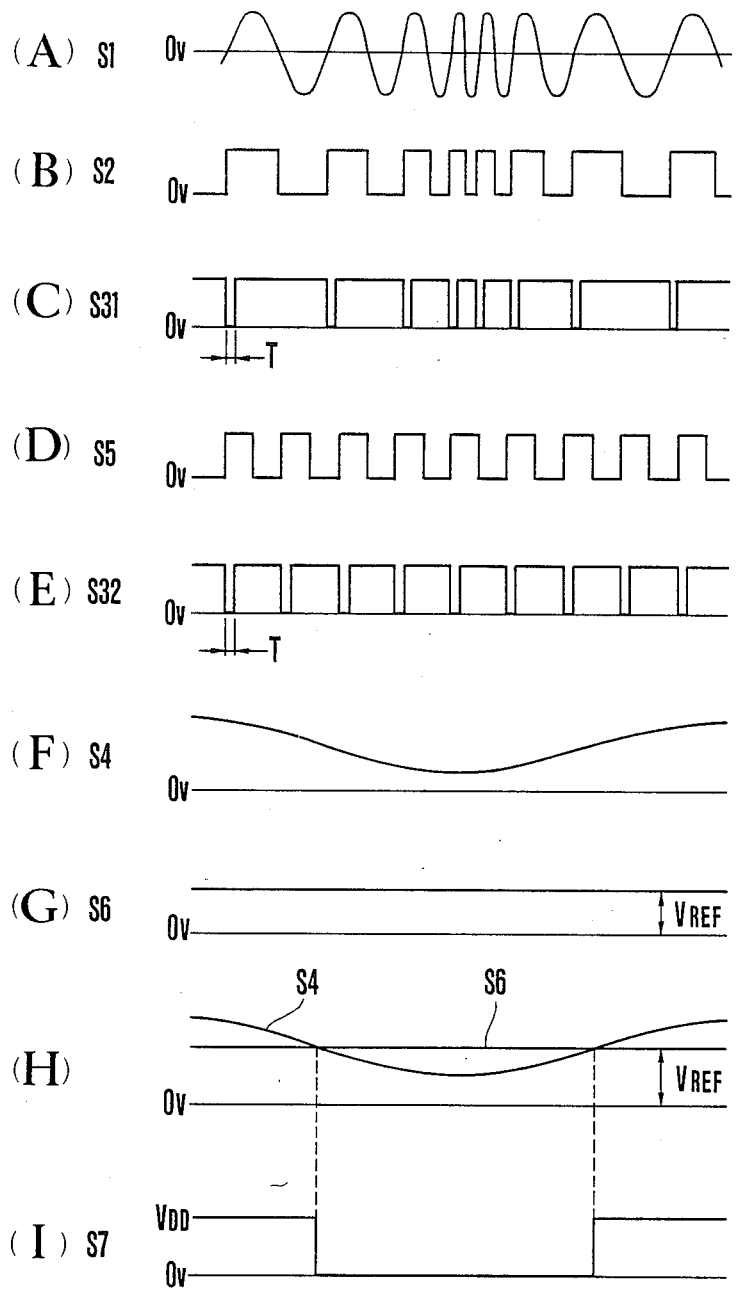
FIG. 3 shows in (A) to (I) waveform charts for explaining the general operation of the demodulation circuit shown in FIG. 2.

FIGS. 3(A) to 3(I) show waveforms of the signals at the respective portions of the demodulation circuit shown in FIG. 2. The FSK signal S1 shown in FIG. 3(A) is input to the input terminal 1 and shaped by the Schmitt trigger circuit 2 to obtain the pulse signal S2 shown in FIG. 3(B). The monostable multivibrator 31 is triggered by the leading edge of each pulse of the signal S2 and outputs the PPM signal S31 shown in FIG. 3(C). The PPM signal S31 consists of a pulse train of pulses having a pulse width T determined by the time constant of a circuit consisting of the resistor 33 and the capacitor 34. The PPM signal S31 is supplied to the low-pass filter 4 to obtain the baseband signal S4 shown in FIG. 3(F).

The monostable multivibrator 32 receives the clock signal S5 having the same frequency as the center frequency, that is, intermediate frequency of the input signal S1 from the crystal oscillator 5, and outputs a signal S32 consisting of a pulse train shown in FIG. 3(E). The pulses of the signal S32 have the same pulse width as the pulse width T of the signal S31 and a constant separation. The signal S32 is supplied to the low-pass filter 6 to obtain the signal S6 having a DC voltage VREF as shown in FIG. 3(G). The output signals S4 and S6 from the low-pass filters 4 and 6 are compared with each other by the comparator 7 as shown in FIG. 3(H), and a demodulated signal S7 shown in FIG. 3(I) is output from the comparator 7. When the signal S4 is larger than the signal S6, the output voltage of the demodulated signal S7 is VDD. When the signal S4 is smaller than the signal S6, the output voltage of the demodulated signal S7 is 0 V. Since the center frequency of the input signal S1 is the same as the oscillating frequency of the crystal oscillator 5, the center voltage of the signal S4 applied to the comparator 7 coincides with the voltage VREF of the signal S6. As a result, the modulation data is correctly demodulated.

A case wherein the pulse width of the output signals S31 and S32 from the monostable multivibrators 31 and 32, respectively, vary upon temperature changes will be described with reference to the waveform charts of FIGS. 4(A) to 4(H).

Figure 4:
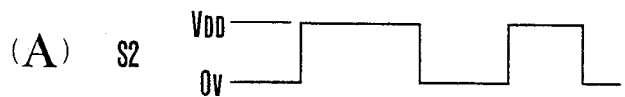
FIG. 4 shows in (A) to (H) waveform charts for explaining the operation of the demodulation circuit shown in FIG. 2 when the pulse width changes.
Figure 4:
Figure 4:
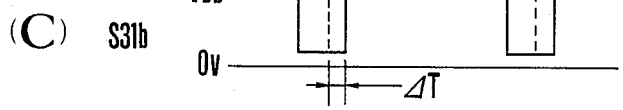
Figure 4:
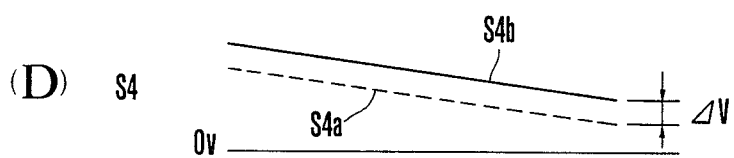
Figure 4:
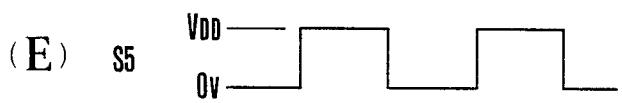
Figure 4:
Figure 4:
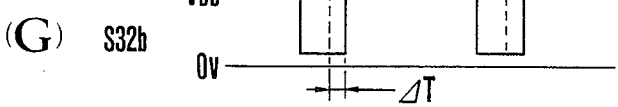
Figure 4:
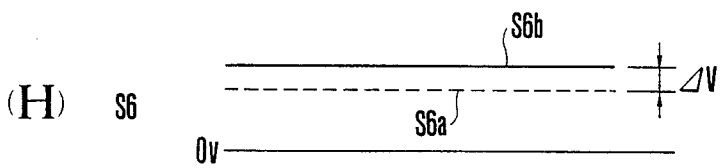

FIGS. 4(A) and 4(E) show the waveforms of the input signals S2 and S5 supplied to the monostable multivibrators 31 and 32, respectively. Normal output signals from the multivibrators 31 and 32 are signals S31a and S32a consisting of pulses having a pulse width T as shown in FIGS. 4(B) and 4(F), respectively. The output signals S4 and S6 from the low-pass filters 4 and 6 with respect to the signals S31a and S32a correspond to signals S4a and S6a respectively indicated by broken lines in FIGS. 4(D) and 4(H).

Assume that the ambient temperature is changed, that the resistances of the resistors 33 and 35 and the capacitances of the capacitors 31 and 32 are changed accordingly, that the output pulse width T is increased by ΔT, and that the outputs from monostable multivibrators 31 and 32 become signals S31b and S32b as shown in FIGS. 4(C) and 4(G). Since the temperature characteristics of the resistors 33 and 35 and those of the capacitors 31 and 32 are the same, the output pulse widths of the signals S31b and S32b change in the same manner. Therefore, the signals S4 and S6 obtained when the PPM signals S31b and S32b are respectively supplied to the low-pass filters 4 and 6 respectively become signals S4b and S6b larger than the signals S4a and S6a by ΔV, as shown in FIGS. 4(D) and 4(H). Since the comparator 7 compares the signals S4 and S6, the respective voltage changes ΔV are canceled. As a result, the threshold voltage of the comparator 7 with respect to the signal to be demodulated is kept substantially constant.

Figure 5:
FIG. 5 shows in (A) to (H) waveform charts for explaining the operation of the demodulation circuit shown in FIG. 2 when the pulse amplitude changes.
Figure 5:
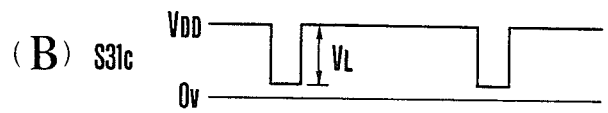
Figure 5:
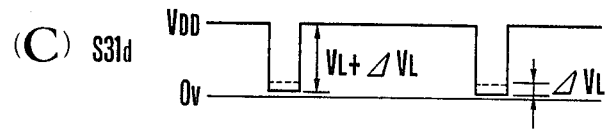
Figure 5:
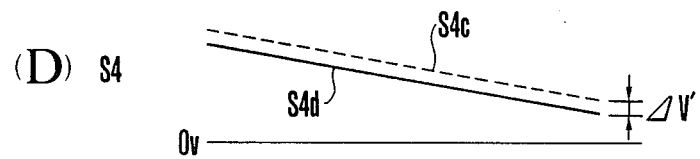
Figure 5:
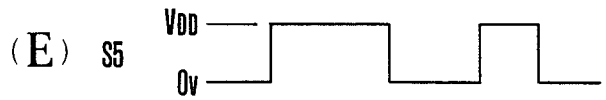
Figure 5:
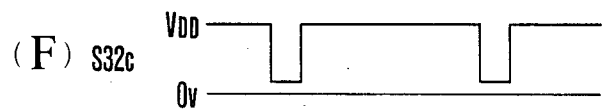
Figure 5:
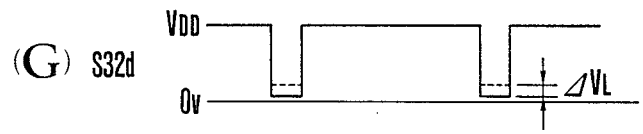
Figure 5:
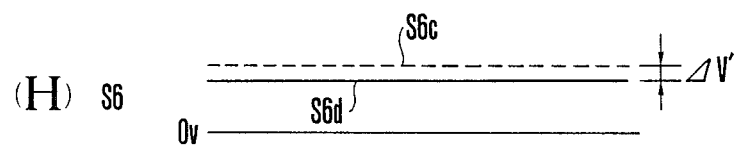

A case wherein the amplitudes of the pulses of the signals S31 and S32 respectively output from the monostable multivibrators 31 and 32 are varied upon temperature changes will be described with reference to FIGS. 5(A) to 5(H). FIGS. 5(A) and 5(E) show the waveforms of the input signals S2 and S6 to the multivibrators 31 and 32. FIGS. 5(B) and 5(F) show output signals S31c and S32c of the multivibrators 31 and 32 before the pulse amplitudes are changed. In this case, the output signals from the low-pass filters 4 and 6 are signals S4c and S6c respectively indicated by broken lines in FIGS. 5(D) and 5(H). Assume that when the ambient temperature is changed, the output signals S31 and S32 from the monostable multivibrators 31 and 32, respectively, are changed by ΔVL, as shown in FIGS. 5(C) and 5(G). The output signals S4 and S6 from the low-pass filters 4 and 6 are decreased in voltage by ΔV' and become signals S4d and S6d as shown in FIGS. 5(D) and 5(H), respectively. However, since the comparator 7 compares the signal S4c with the signal S6c, and the signal S4d with the signal S6d, ΔV' caused by the change in pulse amplitude is canceled, and the threshold voltage of the comparator 7 is kept at a constant value.

As described above, even when the amplitude and pulse width of the output pulses of the monostable multivibrator 31 are varied upon temperature changes or the like, a data signal can be stably demodulated without any adverse influence.

As described above, according to the present invention, two monostable multivibrators formed on the same chip are used. A modulated signal is supplied to one of the multivibrators, and a signal having the same frequency as the center frequency of the modulated signal is supplied to the remaining multivibrator from the quartz oscillator. The demodulated voltage of the former multivibrator is compared with a reference voltage obtained by the latter multivibrator. As a result, a demodulation circuit not influenced by a change in source voltage or temperature can be obtained. When the demodulation circuit is used for demodulating an FSK signal or a binary FM signal, a considerably good effect can be obtained.

What is claimed is:

1. A demodulation circuit comprising:
   a Schmitt trigger circuit for converting a modulated signal which is modulated by data into a pulse signal;
   a first monostable multivibrator for converting an output from said Schmitt trigger circuit into a Pulse Position Modulated (PPM) signal;
   a quartz oscillator for oscillating at the same frequency as the center frequency of the modulated signal;
   a second monostable multivibrator, formed on the same chip as said first monostable multivibrator and responsive to an output signal from said quartz oscillator, for generating a signal comprising a pulse train having the same pulse width as that of the PPM signal output from said first monostable multivibrator and a constant pulse separation;
   a first low-pass filter for receiving an output from said first monostable multivibrator;
   a second low-pass filter for receiving an output from said second monostable multivibrator; and
   a comparator for comparing an output signal from said first low-pass filter with an output signal from said second low-pass filter as a threshold level, and obtaining the data.

2. A demodulation circuit according to claim 1, wherein said first and second monostable multivibrators are formed on the same chip, a time constant circuit comprising a resistor and a capacitor is provided to each of said first and second monostable multivibrators to determine a pulse width of the output signal therefrom, and resistances and temperature characteristics of said resistors, and capacitances and temperature characteristics of said capacitors are the same.

3. A demodulation circuit comprising:
   first monostable multivibrator means for converting an input signal to a first pulse position modulated (PPM) signal;
   oscillator means for generating an oscillation signal;
   second monostable multivibrator means for converting said oscillation signal to a signal of a pulse train having a constant pulse separation, said first and second monostable multivibrator means being formed on the same chip;
   first and second filter means for filtering said first PPM signal and said signal of a pulse train having a constant pulse separation, respectively, to provide first and second filtered signals, respectively; and
   comparator means for comparing said first and second filtered signals to provide a demodulated signal.

4. A demodulation circuit according to claim 3, wherein said input signal is a frequency shift keyed (FSK) signal.

5. A demodulation circuit according to claim 4, further comprising converting means connected to the input of said first monostable multivibrator means for converting said FSK signal to a pulsed signal and supplying it to said first monostable multivibrator means.

6. A demodulation circuit according to claim 5, wherein said converting means comprises a Schmitt trigger circuit.

7. A demodulation circuit according to claim 3, wherein said oscillator means comprises a quartz oscillator.

8. A method of demodulating an input signal to provide a demodulated signal, comprising the steps of:
   converting said input signal to a first pulse position modulated (PPM) signal;
   generating an oscillator signal;
   converting said oscillator signal to a signal of a pulse train having a constant pulse separation, said steps of converting said input signal and of converting said oscilllation signal being performed on the same chip;
   filtering said first PPM signal and said signal of a pulse train having a constant pulse separation to provide first and second filtered signals, respectively; and
   comparing said first and second filtered signals to provide and demodulated signal.

* * * * *